United States Patent
Kim

(10) Patent No.: US 10,882,428 B2
(45) Date of Patent: Jan. 5, 2021

(54) ARMREST APPARATUS AND INDUSTRIAL VEHICLE INCLUDING THE SAME

(71) Applicant: DOOSAN CORPORATION, Seoul (KR)

(72) Inventor: Woong Kim, Gyeonggi-do (KR)

(73) Assignee: DOOSAN CORPORATION, Seoul (KR)

( * ) Notice: Subject to any disclaimer, the term of this patent is extended or adjusted under 35 U.S.C. 154(b) by 117 days.

(21) Appl. No.: 16/233,429

(22) Filed: Dec. 27, 2018

(65) Prior Publication Data
US 2020/0207245 A1    Jul. 2, 2020

(51) Int. Cl.
*B60N 2/75* (2018.01)

(52) U.S. Cl.
CPC .............. *B60N 2/77* (2018.02); *B60N 2/773* (2018.02); *B60N 2/797* (2018.02)

(58) Field of Classification Search
CPC ............ B60N 2/77; B60N 2/797; B60N 2/24
See application file for complete search history.

(56) References Cited

U.S. PATENT DOCUMENTS

| | | | | |
|---|---|---|---|---|
| 4,702,520 A * | 10/1987 | Whisler | ................. | B60N 2/767 297/411.36 |
| 5,938,282 A * | 8/1999 | Epple | ..................... | B60N 2/797 297/217.3 |
| 7,387,342 B1 * | 6/2008 | Clough | ..................... | B60N 2/77 297/411.36 |
| 7,458,439 B2 * | 12/2008 | Catton | ................... | B60N 2/767 180/334 |
| 7,600,819 B2 * | 10/2009 | Armo | ..................... | B60N 2/767 297/411.35 |
| 7,726,745 B2 * | 6/2010 | Bruns | ...................... | A47C 7/54 297/411.36 |
| 8,388,262 B2 * | 3/2013 | Klein | ..................... | E02F 9/2004 404/83 |
| 8,483,914 B2 * | 7/2013 | Copeland | ............. | B60N 2/0232 701/50 |
| 2010/0026026 A1 * | 2/2010 | Akahane | .................. | B60N 2/77 296/24.34 |
| 2016/0272328 A1 * | 9/2016 | McGreevy | ............. | B60N 2/753 |
| 2018/0230675 A1 * | 8/2018 | Kato | ....................... | E02F 9/166 |

FOREIGN PATENT DOCUMENTS

EP       0669222 A1 *   8/1995   .............. B60N 2/78

* cited by examiner

*Primary Examiner* — David R Dunn
*Assistant Examiner* — Tania Abraham
(74) *Attorney, Agent, or Firm* — Volpe Koenig

(57) ABSTRACT

An exemplary embodiment of the present disclosure relates to an armrest apparatus and an industrial vehicle including the same, and the armrest apparatus disposed in a driver seat includes: an armrest body which supports an operator's arm; and a drive unit which has a variable length, provides power to move the armrest body upward, and absorbs force applied in a direction in which the armrest body moves downward.

11 Claims, 12 Drawing Sheets

ARMREST APPARATUS AND INDUSTRIAL VEHICLE INCLUDING THE SAME

TECHNICAL FIELD

The present disclosure relates to an armrest apparatus and an industrial vehicle including the same, and more particularly, to an armrest apparatus on which an operator's arm is placed and which is adjustable in height, and to an industrial vehicle including the same.

BACKGROUND

In general, an armrest apparatus is provided in a cabin to allow an operator to place his/her arm on the armrest apparatus. When the operator places his/her arm on the armrest apparatus, the operator easily manipulates a joystick for controlling a manipulator. Otherwise, the operator may place his/her arm on the armrest apparatus when the operator drives a vehicle.

However, the same industrial apparatus (vehicle) may be manipulated by the operator at different times. Specifically, in a case in which operators, who have different height or different arm lengths, perform work by driving the same vehicle, there is a problem in that the operators suffer from increased fatigue because the position of the armrest apparatus is fixed.

Alternatively, in the case of an armrest apparatus in the related art which is adjustable in height, the position of the armrest apparatus is adjusted by a protrusion mechanically inserted between catching projections. In this case, there is a problem in that the position of the armrest apparatus is adjusted only in a distance between the catching projections. In addition, there is a problem in that noise occurs when the operator adjusts a height of the armrest apparatus. In this case, in a case in which an armrest is pressed by an operator, there is a problem in that the catching projections and the protrusion need to support a load of the armrest.

SUMMARY

The present disclosure has been made in an effort to provide an armrest apparatus which is adjustable in height by an operator and an industrial vehicle including the same.

An exemplary embodiment of the present disclosure provides an armrest apparatus disposed on an operator seat, the armrest apparatus including: an armrest body which supports an operator's arm; and a drive unit which has a variable length, provides power to move the armrest body upward, and absorbs force applied in a direction in which the armrest body moves downward.

The drive unit may include: a cylinder which is extended or retracted in accordance with an expanded state of a compressed fluid and configured to move the armrest body upward or downward; and a connecting bracket which connects one end of the cylinder and the armrest body.

The armrest apparatus may further include a first plate which is disposed inside the armrest body and supports the armrest body in one direction.

The connecting bracket may include: a support member which is coupled to the first plate; and a rotation restricting member which has a central portion protruding from the support member to support one end of the cylinder, and has both sides connected to the support member to restrict a rotation of one end of the cylinder.

A through hole may be formed in the first plate so that one end of the cylinder penetrates the through hole, and the connecting bracket may include: a support member which is disposed on the first plate so as to be movable upward or downward, has therein a support hole formed to face the through hole, and has an outer portion having a length relatively greater than a diameter of the through hole; and a rotation restricting member which has a central portion protruding from the support member to support one end of the cylinder, and has both sides connected to the support member to restrict a rotation of one end of the cylinder.

The drive unit may further include a guide member that guides an upward/downward movement of the armrest body supported by the first plate.

The armrest apparatus may further include a second plate which is disposed below the first plate so as to be spaced apart from the first plate and has a guide hole formed such that the other side of the guide member is inserted into the guide hole.

The armrest body may include: a first body which is coupled to the connecting bracket; and a second body which is disposed below the first body and supports the first body.

One side of the first plate may support the armrest body, and the other side of the first plate may support a joystick.

The first plate may be bent such that one side of the first plate is disposed higher than the other side of the second plate.

Another exemplary embodiment of the present disclosure provides an industrial vehicle including an operation region in which an operator is seated, the industrial vehicle including: a support frame which is disposed in the operation region; a joystick which is manipulated by the operator; an armrest body which is disposed on the support frame and has a joystick installation hole in which the joystick is installed; a first plate which is disposed inside the armrest body, and has one side that supports the armrest body, and the other side that supports the joystick; a second plate which is disposed inside the armrest body below the first plate and has a guide hole; a guide member which has one side that supports the first plate, and the other side that is inserted into the guide hole and slidably supported; a cylinder which provides power to move the first plate upward from the second plate; and an upward/downward movement adjusting member which is disposed in the operation region and controls extension or retraction of the cylinder.

The armrest body may include: a first body which is disposed on the support frame, is supported by the first plate, and has the joystick installation hole; and a second body which is disposed between the first body and the support frame.

Still another exemplary embodiment of the present disclosure provides an industrial vehicle including an operation region in which an operator is seated, the industrial vehicle including: a support frame which is disposed in the operation region; a joystick which is manipulated by the operator; a first body which is disposed on the support frame and supports the operator's arm; a second body which is disposed between the first body and the support frame and has a joystick installation hole in which the joystick is installed; a first plate which has one side that supports the second body, and the other side that supports a joystick; a cylinder which provides power to move the first body upward from the second body; and an upward/downward movement adjusting member which is disposed in the operation region and controls extension or retraction of the cylinder.

The industrial vehicle may further include a cover which is disposed between the first body and the second body and extendable and retractable in accordance with the upward/downward movement of the first body.

According to the exemplary embodiments of the present disclosure, in accordance with the operator's preference, the operator seated in the industrial vehicle including the armrest apparatus may adjust the armrest apparatus on which the operator's arm may be placed.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
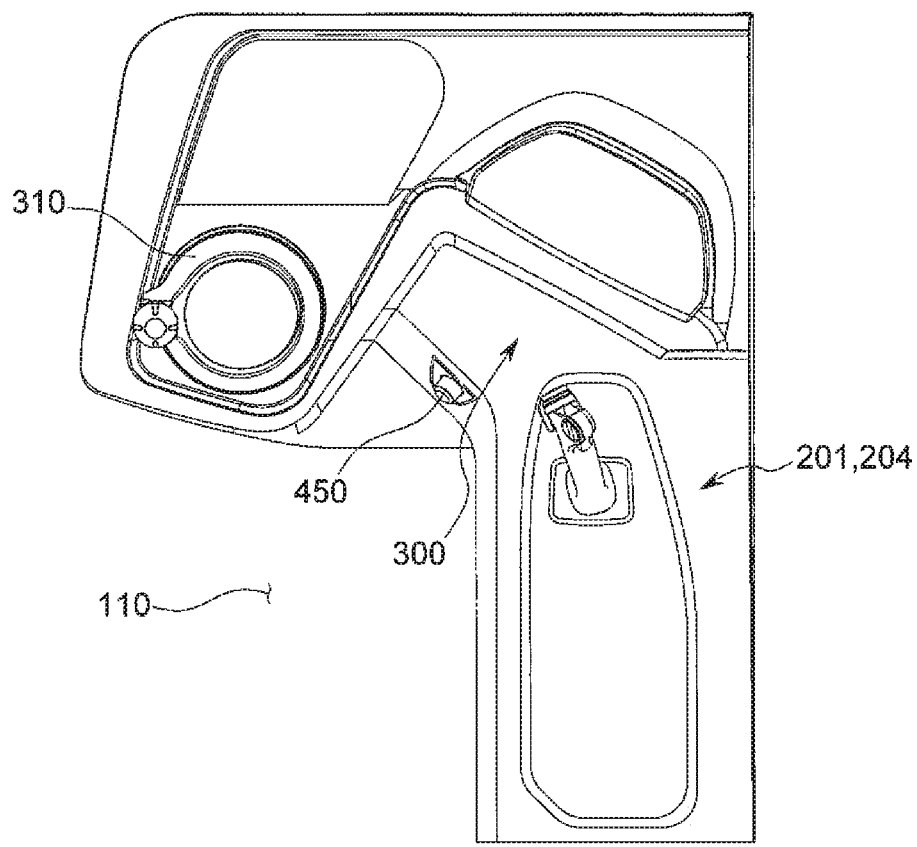
FIG. 1 is a view illustrating an industrial vehicle having an armrest apparatus according to a first exemplary embodiment or a fourth exemplary embodiment of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, exemplary embodiments of the present disclosure will be described in detail with reference to the accompanying drawings so that those skilled in the technical field to which the present disclosure pertains may easily carry out the exemplary embodiment. The present disclosure may be implemented in various different ways, and is not limited to the exemplary embodiments described herein.

It is noted that the drawings are schematic, and are not illustrated based on actual scales. Relative dimensions and proportions of parts illustrated in the drawings are exaggerated or reduced in size for the purpose of clarity and convenience in the drawings, and any dimension is just illustrative but not restrictive. The same reference numerals designate the same structures, elements or components illustrated in two or more drawings in order to exhibit similar characteristics.

Exemplary embodiments of the present disclosure illustrate ideal exemplary embodiments in more detail. As a result, various modifications of the drawings are expected. Therefore, the exemplary embodiments are not limited to specific forms in regions illustrated in the drawings, and for example, include modifications of forms by the manufacture thereof.

Hereinafter, an armrest apparatus 201, which is installed in an industrial vehicle 100 according to a first exemplary embodiment of the present disclosure, will be described with reference to FIGS. 1 to 4.

The armrest apparatus 201 is installed in an operation region 110 in which an operator may be seated. Specifically, the operation region 110 may be an interior of a cabin including an operator seat in the industrial vehicle 100. In the present disclosure, the industrial vehicle 100 may be defined as all vehicles such as fork lifts, excavators, and wheel loaders which load and carry loads indoor and outdoor, or excavate and carry soil by utilizing hydraulic working machines.

Figure 2:
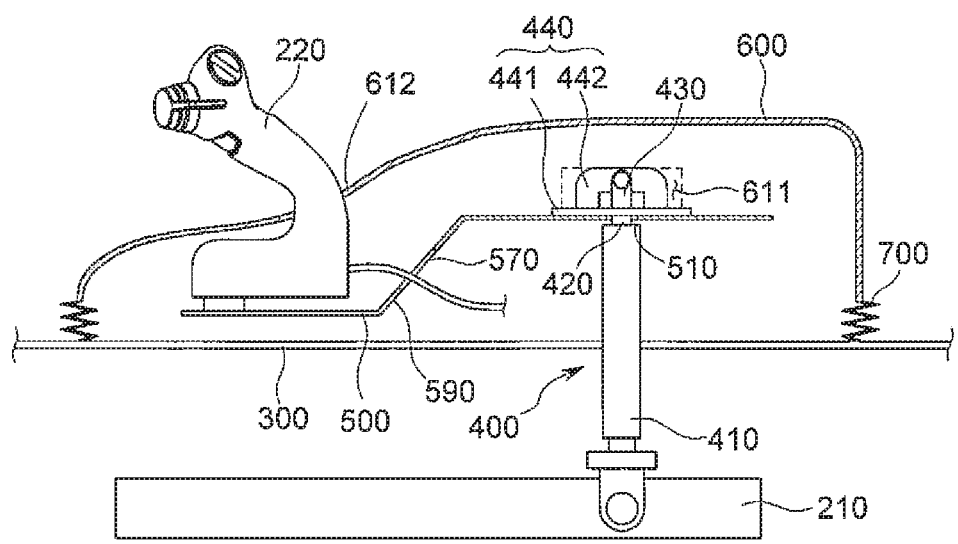
FIGS. 2 and 3 are views illustrating an operating state of the armrest apparatus according to the first exemplary embodiment of the present disclosure.
Figure 3:
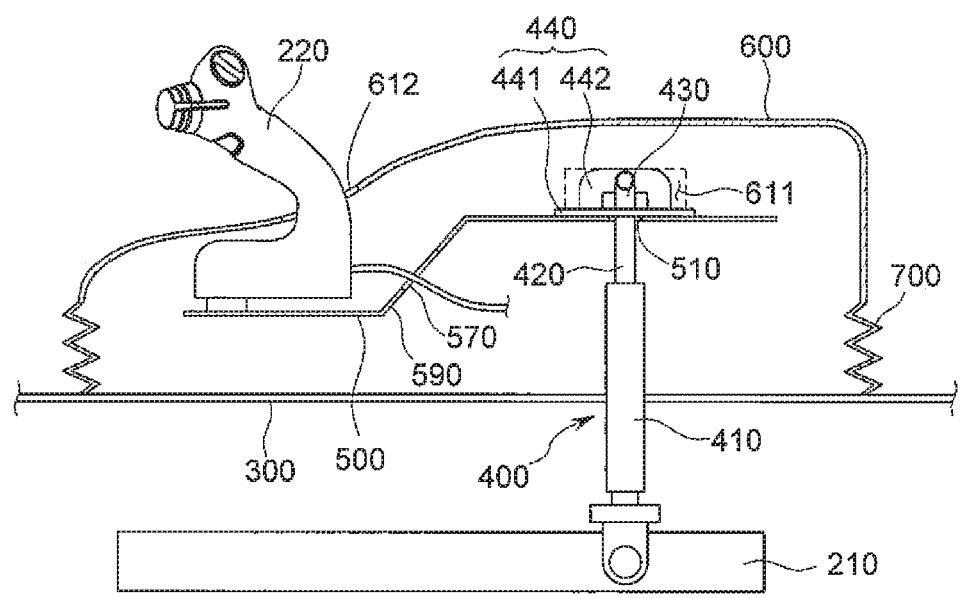

As illustrated in FIG. 2, the armrest apparatus 201 may include an armrest body 600 and a drive unit 400.

The armrest body 600 supports an operator's arm. In addition, the armrest body 600 may be disposed on an operator seat and may support the operator's arm in a longitudinal direction of the operator's arm when the operator is seated in the operator seat.

Specifically, the armrest body 600 may be disposed on a support frame 300 disposed on a stationary base 210 on which the operator seat is supported. The stationary base 210 is disposed at a position relatively lower than the operator seat in which an operator is seated, and the stationary base 210 may support the support frame 300. The support frame 300 is disposed to be spaced apart from one side of the operator seat in which the operator is seated.

The support frame 300 may be disposed above the stationary base 210. As an example, the support frame 300 may be formed integrally with a dashboard on which an instrument panel, a handle 310, and the like are supported.

The drive unit 400 may move the armrest body 600 upward or downward by increasing or decreasing a length thereof by using pressure of a fluid. Specifically, the drive unit 400 is disposed between the armrest body 600 and the stationary base 210 and may provide power so that the armrest body 600 disposed on the support frame 300 may be moved upward or downward. In this case, the drive unit 400 may provide power required to move the armrest body 600 upward or downward by using pressure caused by expansion and compression of the fluid.

The drive unit 400 is disposed between the armrest body 600 and the stationary base 210 or the support frame 300 and may absorb force which is applied to one surface of the armrest body 600 in a direction in which the armrest body 600 is moved downward.

That is, the drive unit 400 may absorb force which is applied in a direction in which one surface of the armrest body 600 is moved away from the support frame 300 or in a direction in which one surface of the armrest body 600 is moved close to the support frame 300.

As described above, with the configuration according to the first exemplary embodiment of the present disclosure, the armrest apparatus 201 enables the operator to adjust a height of the armrest body 600 to a desired position. Therefore, in accordance with the operator's body condition or the operator's preference, the operator may effectively adjust the height of the armrest body 600 for supporting the operator's arm. Further, since the drive unit 400 may move the armrest body 600 upward or downward by using the pressure of the fluid, it is possible to reduce noise occurring when the armrest body 600 is moved upward or downward and to finely adjust the height in accordance with the operator's preference.

The drive unit 400 of the armrest apparatus 201 according to the first exemplary embodiment of the present disclosure may include a cylinder 410 and a connecting bracket 440.

The cylinder 410 may move the armrest body 600 upward or downward. Specifically, the fluid is stored in the cylinder 410, and the length of the drive unit 400 is changed as a piston rod 420 in the cylinder 410 is extended or retracted in accordance with the expansion or contraction of the stored fluid. Therefore, the upward or downward movement of the armrest body 600 may be controlled by the extension or retraction of the cylinder (410) and the piston rod 420 installed in the cylinder 410.

The connecting bracket 440 may connect one end of the cylinder 410 and the armrest body 600. The connecting bracket 440 may transmit driving power, which is generated by the change in length of the cylinder 410, to the armrest body 600.

Specifically, the connecting bracket 440 may connect the armrest body 600 to one end of the piston rod 420 which is extended from or retracted to the cylinder 410. That is, the connecting bracket 440 may be coupled to one end of the piston rod 420.

The other end of the cylinder 410 may be supported on the stationary base 210. Therefore, the cylinder 410 may move the armrest body 600 upward when one end of the piston rod 420 moves away from the stationary base 210, and the cylinder 410 may move the armrest body 600 downward when one end of the piston rod 420 moves close to the stationary base 210.

As an example, the cylinder 410 of the armrest apparatus 201 according to the first exemplary embodiment of the present disclosure may be a gas spring.

The gas spring provides force in a direction in which the armrest body 600 moves upward. When the operator presses one surface of the armrest body 600 in a direction opposite to the direction in which the armrest body 600 moves upward, the gas spring may set the height of the armrest body 600 to a desired position. In addition, when force is applied to one surface of the armrest body 600 in a direction in which the piston rod 420 is retracted, the gas spring may absorb the force to be applied to the stationary base 210 or the support frame 300 on which the armrest body 600 is supported.

In the gas spring, the length of the piston rod 420 from the cylinder 410 may be increased and decreased as gas in the cylinder 410 is expanded and compressed.

As illustrated in FIG. 1, the armrest apparatus 201 according to the first exemplary embodiment of the present disclosure may further include an upward/downward movement adjusting member 450.

The upward/downward movement adjusting member 450 is disposed in the operation region 110 and may control a position of a release pin so that the gas spring may be extended or retracted. The upward/downward movement adjusting member 450 may be disposed between the handle 310 and the armrest body 600 in the operation region 110.

Specifically, the upward/downward movement adjusting member 450 is formed in the form of a push button. When the operator presses the upward/downward movement adjusting member 450, the release pin of the gas spring is controlled so that the compressed gas in the cylinder 410 is expanded, such that the piston rod 420 of the cylinder 410 may be extended. In this case, the armrest body 600 may be moved upward.

The operator may adjust the height of the armrest body 600 by pressing one surface of the armrest body 600, which moves upward, in the direction opposite to the direction in which the armrest body 600 moves upward while pressing the upward/downward movement adjusting member 450. When the operator releases pressing force being applied to the upward/downward movement adjusting member 450 at the adjusted height, the gas in the cylinder 410 is compressed, and the height of the armrest body 600 may be maintained at the current position.

Even though pressing force is applied, by the operator, to one surface of the armrest body 600 at the current fixed position, the cylinder 410 may absorb and support the pressing force by using the gas stored in the cylinder 410.

As an example, the upward/downward movement adjusting member 450, which is formed in the form of a push button and adjusts the extension and retraction of the cylinder 410, is installed on the dashboard 300 on which the handle 310 is supported, and the upward/downward movement adjusting member 450 may be manipulated by the operator's left hand.

Alternatively, the upward/downward movement adjusting member 450 may be installed at a lower side in the operation region 110, such that the upward/downward movement adjusting member 450 may adjust the extension and retraction of the cylinder 410 by being manipulated by the operator's foot.

The armrest apparatus 201 according to the first exemplary embodiment of the present disclosure may further include a first plate 500.

The first plate 500 is disposed inside the armrest body 600 and may support the armrest body 600 in one direction. The first plate 500 is disposed to be elongated along the armrest body 600 in the longitudinal direction of the operator's arm, thereby supporting the armrest body 600 in the longitudinal direction.

That is, at least one region of the first plate 500 may support the armrest body 600.

The armrest body 600 may effectively support, by the first plate 500, deformation of the armrest body 600 caused by a load applied by the operator.

Figure 4:
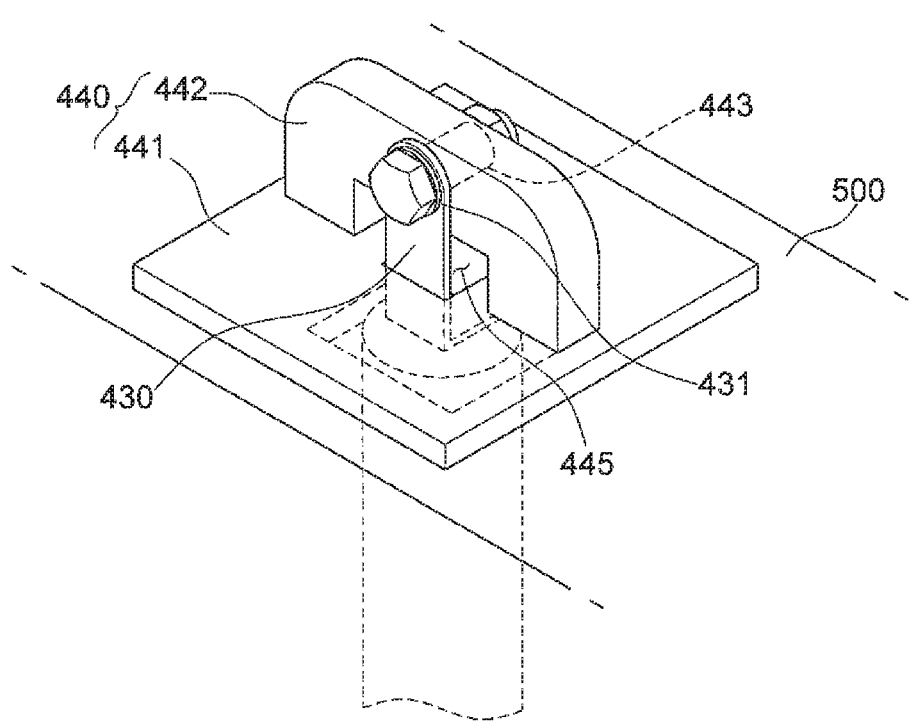
FIG. 4 is a view illustrating a connecting bracket.

As illustrated in FIG. 4, the connecting bracket 440 according to the first exemplary embodiment of the present disclosure may include a support member 441 and a rotation restricting member 442.

The support member 441 is coupled to the first plate 500. In addition, one surface of the support member 441 may be coupled to the first plate 500, and the other surface of the support member 441 may be disposed to face the interior of the armrest body 600. Specifically, the support member 441 may be formed in a flat plate shape parallel to one side of the first plate 500.

The rotation restricting member 442 is disposed on the support member 441, a central portion of the rotation restricting member 442 protrudes to be spaced apart from the support member 441, and both sides of rotation restricting member 442 are connected to and supported on the support member 441.

Specifically, the central portion of the rotation restricting member 442 may protrude in a direction that intersects one surface of the flat plate shape of the support member 441.

The central portion of the rotation restricting member 442 is coupled to one end of the cylinder 410, such that power for moving the armrest body 600 upward or downward may be effectively transmitted to the armrest body 600 from one end of the cylinder 410. That is, the central portion of the rotation restricting member 442 may be coupled to one end of the piston rod 420 of the cylinder 410.

The piston rod 420 includes a pair of rod connecting ends 430 which is disposed in a longitudinal direction of the piston rod 420 and spaced apart from each other at one end of the piston rod 420. Fastening holes 431 may be formed in the rod connecting ends 430, respectively.

The central portion of the rotation restricting member 442 may be disposed at a center of the pair of rod connecting ends 430 and coupled to the cylinder 410. Specifically, a connecting hole 443 may be formed in the central portion of the rotation restricting member 442 so as to face the fastening holes 431. That is, a first fastening member penetrates the connecting hole 443 and the fastening holes 431 formed in the pair of rod connecting ends 430, such that the connecting bracket 440 and the piston rod 420 of the cylinder 410 may be fastened to each other.

Both sides of the rotation restricting member 442 are connected to the support member 441, and as a result, the rotation of one end of the cylinder 410 and the rotation of the central portion of the rotation restricting member 442 may be restricted by interference between the pair of rod connecting ends 430 or the piston rod 420 and both sides of the rotation restricting member 44.

The length of the pair of rod connecting ends 430 in the longitudinal direction of the piston rod 420 may be relatively shorter than the height of the protruding rotation restricting member 442.

That is, the rotation restricting member 442 may prevent force in the extension direction of the cylinder 410 from being dispersed, when the force is transmitted to the armrest body 600, due to the rotation that occurs when the connecting bracket 440 and the piston rod 420 are coupled to each other.

Specifically, a through hole 510 may be formed at one side of the first plate 500 according to the first exemplary embodiment of the present disclosure. The through hole 510 may be formed such that one end of the cylinder 410 penetrates the through hole 510.

A support hole 445, which faces the through hole 510 formed in the first plate 500, may be formed in the support member 441. Further, both sides of the rotation restricting member 442 are spaced apart from each other based on the support hole 445 and may be supported on the support member 441.

Therefore, the pair of rod connecting ends 430 may pass through the through hole 510 formed in the first plate 500 and the support hole 445 formed in the support member 441 and may be fastened to the central portion of the rotation restricting member 442. That is, the pair of rod connecting ends 430 may support lateral surfaces of the central portion of the rotation restricting member 442.

As an example, the rotation restricting member 442 may be formed approximately in an inverted U shape on the other surface of the support member 441.

The first plate 500 of the armrest apparatus 201 according to the first exemplary embodiment of the present disclosure may support a joystick 220.

The joystick 220 may be installed in the operation region 110 in the industrial vehicle 100 in which the operator may be seated, and the joystick 220 may control the manipulation of the working machine operated by hydraulic pressure in order to operate the industrial vehicle 100 or perform work of the industrial vehicle 100.

The first plate 500 may support the joystick 220. Specifically, one side of the first plate 500 may support the armrest body 600, and the other side of the first plate 500 may support the joystick 220. In addition, one side of the first plate 500 may transmit raising force, which is generated by the extension of the cylinder 410, to the armrest body 600, and the other side of the first plate 500 may support the joystick 220.

A joystick installation hole 612 may be formed in one region of the armrest body 600 that faces the other side of the first plate 500. That is, one side of the joystick 220 may be supported at the other side of the first plate 500, and the other side of the joystick 220 may be disposed to protrude to the outside of the armrest body 600 through the joystick installation hole 612 formed in the armrest body 600. Therefore, the operator may control the operation of the working machine by manipulating the other side of the joystick 220.

Therefore, when the piston rod 420 of the cylinder 410 is extended, the joystick 220 installed on the first plate 500 may be moved upward together with the armrest body 600. The operator may effectively manipulate the joystick 220 moved upward along with the upward movement of the armrest body 600.

The first plate 500 of the armrest apparatus 201 according to the first exemplary embodiment of the present disclosure may be bent.

The first plate 500 may be bent between one side and the other side thereof. In addition, the first plate 500 may be bent such that one side of the first plate 500 on which the armrest body 600 or the connecting bracket 440 is installed is positioned at a position relatively higher than a position of the other side of the first plate 500 on which the joystick 220 is installed. As an example, the first plate 500 may be disposed in the operation region 110 such that one side of the first plate 500 is relatively farther from the handle 310 than the other side of the first plate 500 is from the handle 310.

Therefore, one side of the first plate 500, which supports the armrest body 600 in one region in which the operator's arm may be supported on the armrest body 600, is disposed relatively higher than the other side of the first plate 500 that supports the joystick 220, and as a result, the operator may effectively manipulate the joystick 220 while the operator's arm is supported on the armrest body 600.

Specifically, the first plate 500 may have an inclined portion 590. That is, the inclined portion 590 may be formed between one side of the first plate 500 and the other side of the first plate 500. The inclined portion 590 may connect the other side of the first plate 500 and one side of the first plate 500 disposed relatively higher than the other side of the first plate 500. Further, a line installation region 570 in which wires for electronically controlling the joystick 220 may be installed may be formed on the inclined portion 590.

The armrest body 600 according to the first exemplary embodiment of the present disclosure may further include a cover 700 disposed between the support frame 300 and the armrest body 600.

The cover 700 is formed such that a length thereof may be changed. The cover 700 is extended when the armrest body 600 moves upward from the support frame 300, and the cover 700 may effectively cover a separation space between the armrest body 600 and the support frame 300. Specifically, the cover 700 may be disposed in a circumferential direction of the armrest body 600. Therefore, the cover 700 may effectively prevent foreign substances from being introduced into the separation space between the armrest body 600 and the support frame 300 when the armrest body 600 moves upward or downward.

With the configuration as described above, the armrest apparatus 201 according to the first exemplary embodiment of the present disclosure may move the armrest body 600 upward by using expansive force generated when the compressed fluid expands. Specifically, extensive force of the piston rod 420 may be provided to the first plate 500 and the armrest body 600 when the piston rod 420 is extended from the cylinder 410, and as a result, the joystick 220 supported on the first plate 500 may be moved upward together with the armrest body 600 supported on the first plate 500.

That is, the operator may not only adjust an armrest on which the operator's arm is supported, but also adjust the height of the joystick 220 while adjusting the height of the armrest body 600.

Hereinafter, an armrest apparatus 202 according to a second exemplary embodiment of the present disclosure will be described with reference to FIGS. 4 to 7.

The armrest apparatus 202 according to the second exemplary embodiment of the present disclosure includes the armrest body 600 and the drive unit 400 included in the aforementioned first exemplary embodiment of the present disclosure. However, the armrest body 600 of the armrest apparatus 202 according to the second exemplary embodiment of the present disclosure may include a first body 610 and a second body 620.

The first body 610 of the armrest apparatus 202 according to the second exemplary embodiment of the present disclosure is coupled to the connecting bracket 440 or the first body 610. Specifically, one side of the first body 610 may support the operator's arm. In addition, the other side of the first body 610 is disposed to face the first plate 500 and may be supported by the first plate 500. Further, the joystick installation hole 612 may be formed in the first body 610. The connecting bracket 440 may be disposed between the other side of the first body 610 and the first plate 500.

That is, the first plate 500 may be disposed inside the first body 610.

Specifically, a bracket groove 611 is formed at the other side of the first body 610, such that the rotation restricting member 442 of the connecting bracket 440 may be inserted and disposed in the bracket groove 611.

The second body 620 may be disposed below the first body 610. In addition, the second body 620 may be disposed between the stationary base 210 and the support frame 300. Further, the second body 620 may support the first body 610.

That is, the armrest body 600 may include the first body 610 which is supported in the longitudinal direction by the first plate 500, and the second body 620 which is supported in the circumferential direction by the support frame 300.

Therefore, when the piston rod 420 is extended from the cylinder 410, the first body 610 may be moved upward from the fixed second body 620.

The armrest apparatus 202 according to the second exemplary embodiment of the present disclosure may further include the cover 700 disposed between the first body 610 and the second body 620. The cover 700 may be extended when the first body 610 is moved to an increased height from the second body 620. In addition, the cover 700 may prevent foreign substances from being introduced into the separation space between the first body 610 and the second body 620.

The armrest apparatus 202 according to the second exemplary embodiment of the present disclosure may further include the upward/downward movement adjusting member 450 of the armrest apparatus 201 according to the aforementioned first exemplary embodiment of the present disclosure.

With the configuration as described above, the armrest apparatus 202 according to the second exemplary embodiment of the present disclosure may adjust only a height of a part of the armrest body 600 by using expansive force generated when the compressed fluid expands.

In this case, the armrest apparatus 202 may adjust a height of the first body 610 supported on the first plate 500 from the fixed second body 620.

Hereinafter, an armrest apparatus 203 according to a third exemplary embodiment of the present disclosure will be described with reference to FIGS. 4 and 8 to 10.

The armrest apparatus 203 according to the third exemplary embodiment of the present disclosure includes the armrest body 600 included in the aforementioned first exemplary embodiment of the present disclosure, the drive unit 400 having the cylinder 410, the connecting bracket 440, and the first plate 500.

However, in the armrest apparatus 203 according to the third exemplary embodiment of the present disclosure, the armrest body 600 includes the first body 610 and the second body 620.

One surface of the first body 610 supports the operator's arm. In addition, the first body 610 may be disposed above the support frame 300.

The second body 620 may be disposed between the first body 610 and the support frame 300. Further, the second body 620 may be supported on the support frame 300 or the stationary base 210 on which the support frame 300 is supported. Further, the second body 620 is disposed below the first body 610 and may support the first body 610. The first plate 500 is disposed inside the second body 620. The through hole 510 may be formed in the first plate 500 so that one end of the cylinder 410 and the piston rod 420 penetrate the through hole 510.

The drive unit 400 provides power to move the first body 610 upward or downward. In addition, the drive unit 400 may include the connecting bracket 440 having the support member 441 and the rotation restricting member 442.

The connecting bracket 440 provides the first body 610 with power provided by the cylinder 410. That is, the connecting bracket 440 connects one end of the piston rod 420 of the cylinder 410 and the first body 610, such that the first body 610 may be moved upward or downward in accordance with the extension or retraction of the piston rod 420 from/to the cylinder 410. Specifically, the connecting bracket 440 may be disposed below the first body 610.

The connecting bracket 440 according to the third exemplary embodiment of the present disclosure includes the support member 441 and the rotation restricting member 442. The support member 441 is disposed on the first plate 500 so as to be movable upward or downward.

The support member 441 is disposed on the first plate 500 and may allow the first body 610 to move upward when expansive force of the fluid provided from the cylinder 410 is provided through the connecting bracket 440.

One surface of the support member 441 is disposed on the first plate 500, and the other surface of the support member 441 may be coupled to the first body 610. That is, the support member 441 may support a lower surface of the first body 610.

The support hole 445, which faces the through hole 510, may be formed in the support member 441. The pair of rod connecting ends 430, which is spaced apart from each other at one end of the piston rod 420 of the cylinder 410 and disposed in the longitudinal direction of the piston rod 420, may pass through the support hole 445. In addition, the fastening holes 431 may be formed in the rod connecting ends 430, respectively.

The support member 441 may be disposed on the first plate 500 and may have a length relatively greater than a diameter of the through hole 510 to support the lower surface of the first body 610.

The central portion of the rotation restricting member 442 may protrude from the support member 441 toward a lower side of the first body 610. The central portion of the rotation restricting member 442 is disposed at a center of the pair of rod connecting ends 430 and may be coupled to the cylinder 410. Specifically, the connecting hole 443 may be formed in the central portion of the rotation restricting member 442 so as to face the fastening holes 431. That is, the first fastening member penetrates the connecting hole 443 and the fastening holes 431 formed in the pair of rod connecting ends 430, such that the connecting bracket 440 and the piston rod 420 of the cylinder 410 may be fastened to each other. Both sides of the rotation restricting member 442 are spaced apart from each other based on the support hole 445 and may be supported on the support member 441.

Therefore, the pair of rod connecting ends 430 may pass through the through hole 510 formed in the first plate 500 and the support hole 445 formed in the support member 441 and may be fastened to the central portion of the rotation restricting member 442. That is, the pair of rod connecting ends 430 may support lateral surfaces of the central portion of the rotation restricting member 442.

As an example, the rotation restricting member 442 may be formed approximately in an inverted U shape on the other surface of the support member 441.

In addition, both sides of the rotation restricting member 442 are connected to the support member 441, and as a result, the rotation of one end of the cylinder 410 and the rotation of the central portion of the rotation restricting member 442 may be restricted by interference between the pair of rod connecting ends 430 or the piston rod 420 and both sides of the rotation restricting member 442.

The length of the pair of rod connecting ends 430 in the longitudinal direction of the piston rod 420 may be relatively shorter than the height of the protruding rotation restricting member 442. In addition, the pair of rod connecting ends 430 of the piston rod 420 may be disposed such that the rotations of the pair of rod connecting ends 430 are restricted as the rod connecting ends 430 come into contact with a wall surface of the through hole 445 of the support member 441.

That is, the rotation restricting member 442 may prevent force in the extension direction of the cylinder 410 from being dispersed, when the force is transmitted to the armrest body 600, due to the rotation that occurs when the connecting bracket 440 and the piston rod 420 are coupled to each other. Specifically, the bracket groove 611 is formed at the lower side of the first body 610, such that the rotation restricting member 442 of the connecting bracket 440 may be inserted and disposed in the bracket groove 611.

Therefore, the piston rod 420, which is one end of the cylinder 410, is coupled to the connecting bracket 440 by the rotation restricting member 442, thereby effectively providing the first body 610 with power for upward/downward movement provided by the cylinder 410.

The first plate 500 of the armrest apparatus 203 according to the third exemplary embodiment of the present disclosure may support the joystick 220.

The joystick 220 may be installed in the operation region 110 in the industrial vehicle 100 in which the operator may be seated, and the joystick 220 may control the manipulation of the working machine operated by hydraulic pressure in order to operate the industrial vehicle 100 or perform work of the industrial vehicle 100.

The through hole 510 is formed at one side of the first plate 500, and the other side of the first plate 500 may support the joystick 220. In addition, one side of the first plate 500 supports the support member 441 and guides one end of the cylinder 410 so that one end of the cylinder 410 may be moved through the through hole 510, and the other side of the first plate 500 may support the joystick 220.

The joystick installation hole 612 may be formed in one region of the second body 620 at the other side of the first plate 500. That is, one side of the joystick 220 may be supported at the other side of the first plate 500, and the other side of the joystick 220 may be disposed to protrude to the outside of the armrest body 600 through the joystick installation hole 612 formed in the second body 620. Therefore, the operator may control the operation of the working machine by manipulating the other side of the joystick 220.

That is, the joystick 220 supported by the first plate 500 may be disposed at an original position even though the first body 610 moves upward or downward, and as a result, in accordance with the operator's body structure, the operator may effectively adjust the upward/downward movement of the first body 610 on which the operator's arm is placed.

The first plate 500 of the armrest apparatus 203 according to the third exemplary embodiment of the present disclosure may be bent.

The first plate 500 may be bent between one side and the other side thereof. In addition, the first plate 500 may be bent such that one side of the first plate 500 on which the connecting bracket 440 is installed is positioned at a position relatively higher than a position of the other side of the first plate 500 on which the joystick 220 is installed. As an example, the first plate 500 may be disposed in the operation region 110 such that one side of the first plate 500 is relatively farther from the handle 310 than the other side of the first plate 500 is from the handle 310.

Specifically, the first plate 500 may have the inclined portion 590. That is, the inclined portion 590 may be formed between one side of the first plate 500 and the other side of the first plate 500. The inclined portion 590 may connect the other side of the first plate 500 and one side of the first plate 500 disposed relatively higher than the other side of the first plate 500. Further, the line installation region 570 in which wires for electronically controlling the joystick 220 may be installed may be formed on the inclined portion 590.

The armrest apparatus 203 according to the third exemplary embodiment of the present disclosure may further include the upward/downward movement adjusting member 450 of the armrest apparatus 201 according to the aforementioned first exemplary embodiment of the present disclosure.

The armrest apparatus 203 according to the third exemplary embodiment of the present disclosure may further include the cover 700 disposed between the first body 610 and the second body 620. The purpose of providing the cover 700 and the operation method of the cover 700 may be identical to those of the cover 700 of the armrest apparatus 202 according to the aforementioned second exemplary embodiment of the present disclosure.

Hereinafter, an armrest apparatus 204 according to a fourth exemplary embodiment of the present disclosure will be described with reference to FIGS. 1, 11, and 12.

The armrest apparatus 204 according to the fourth exemplary embodiment of the present disclosure includes the armrest body 600, the drive unit 400 including the cylinder 410, the connecting bracket 440, and a guide member 460, the first plate 500, and a second plate 550.

Except for the guide member 460 and the second plate 550, the armrest apparatus 204 according to the fourth exemplary embodiment of the present disclosure may include the same cylinder 410, the same connecting bracket 440, and the same first plate 500 as the armrest apparatus 201 according to the aforementioned first exemplary embodiment of the present disclosure.

The second plate 550 may be disposed below the first plate 500 so as to be spaced apart from the first plate 500. Specifically, the second plate 550 may be supported on the support frame 300 or the stationary base 210 on which the support frame 300 is supported. In addition, the second plate 550 is disposed in the armrest body 600 so as to be spaced apart from the first plate 500 in a direction adjacent to the support frame 300. That is, an installation position of the second plate 550 is fixed.

One side of the guide member 460 is supported on the first plate 500. Specifically, the guide member 460 may be coupled to a lower surface of the first plate 500 or the connecting bracket 440 disposed on the first plate 500. In addition, the guide member 460 may be formed in the form of a round bar. That is, when the first plate 500 is moved upward or downward by the drive unit 400, the guide member 460 may support the upward/downward movement of the first plate 500 while moving together with the first plate 500. That is, the guide member 460 may guide the upward/downward movement of the armrest body 600.

Specifically, in a case in which one side of the guide member 460 is coupled to the connecting bracket 440, one side of the guide member 460 may be coupled to the connecting bracket 440 so as to be spaced apart from one end of the cylinder 410. Alternatively, one side of the guide member 460 may be coupled to the lower surface of the first plate 500.

A guide hole 511 into which the other side of the guide member 460 may be inserted is formed in the second plate 550. Therefore, when the armrest body 600 supported by the first plate 500 is moved upward or downward from/to the cylinder 410 in accordance with the extension or retraction of the piston rod 420, the guide member 460 may guide the movement of the first plate 500 while moving along the guide hole 511.

The guide member 460 may effectively prevent the rotation of the armrest body 600 that may occur in the case in which the first plate 500 is supported only by the cylinder 410 and the armrest body 600 supported by the first plate 500 is moved upward or downward.

A cylinder guide hole 530 may be formed in the second plate 550 of the present disclosure. The cylinder guide hole 530 may be formed to be spaced apart from the guide hole 511. The cylinder guide hole 530 may guide one region of the cylinder 410 so that one region of the cylinder 410 is penetratively disposed in the second plate 550. Therefore, the second plate 550 may be installed without interference between the second plate 550 and the cylinder 410.

The armrest apparatus 204 according to the fourth exemplary embodiment of the present disclosure may further include a bushing 520.

The bushing 520 may be inserted and installed into the guide hole 511, thereby effectively supporting the guide member 460 when the guide member 460 moves. That is, the bushing 520 may be disposed in the guide hole 511, thereby effectively supporting the guide member 460 so that the guide member 460 is moved in the longitudinal direction thereof.

The shape of the first plate 500 shape and the configurations supported by the first plate 500 of the armrest apparatus 204 according to the fourth exemplary embodiment of the present disclosure may be identical to those in the aforementioned first exemplary embodiment of the present disclosure.

The armrest apparatus 204 according to the fourth exemplary embodiment of the present disclosure may further include the upward/downward movement adjusting member 450 of the armrest apparatus 201 according to the aforementioned first exemplary embodiment of the present disclosure.

In the armrest apparatus 204 according to the fourth exemplary embodiment of the present disclosure, magnets 501 may be disposed on the first plate 500 so as to be detachably coupled to the armrest body 600 that faces the first plate 500. A metal material may be disposed on the armrest body 600 so as to face the magnet 501. As an example, the multiple magnets 501 may be disposed on the first plate 500 so as to be spaced apart from one another based on the connecting bracket 440.

Since the armrest body 600 may be detachably coupled to the magnets 501, the constituent elements positioned inside the armrest body 600 may be effectively detached during maintenance.

The magnets 501 may be also installed in an armrest apparatus 205 according to a fifth exemplary embodiment to be described below as well as the armrest apparatuses 201, 202, and 203 according to the aforementioned first to third exemplary embodiments of the present disclosure.

Figure 5:
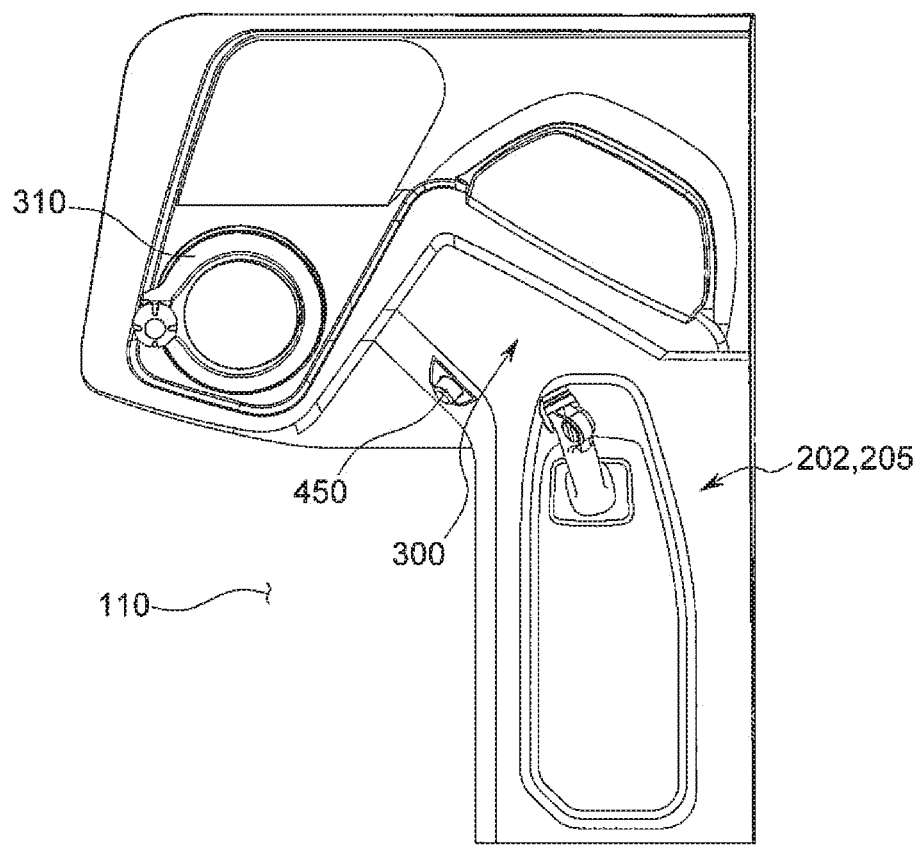
FIG. 5 is a view illustrating an industrial vehicle having an armrest apparatus according to a second exemplary embodiment or a fifth exemplary embodiment of the present disclosure.
Figure 6:
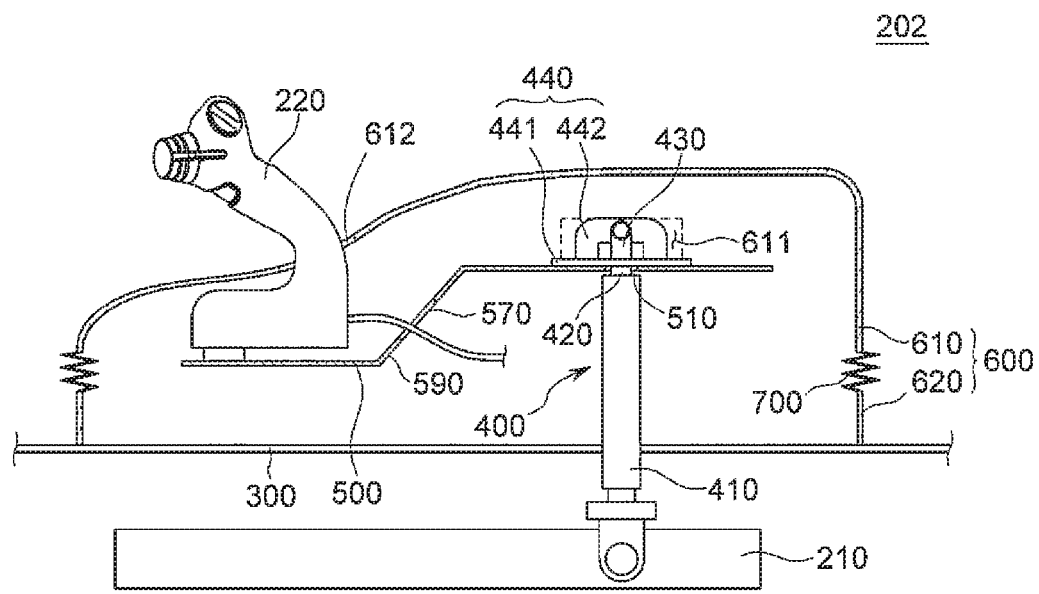
FIGS. 6 and 7 are views illustrating an operating state of the armrest apparatus according to the second exemplary embodiment of the present disclosure.
Figure 7:
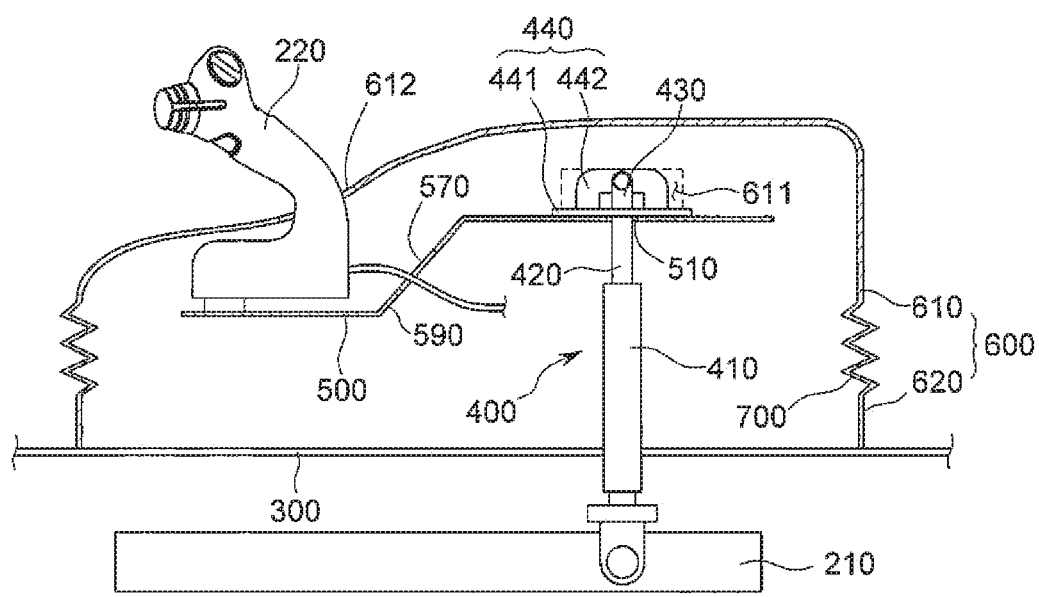
Figure 8:
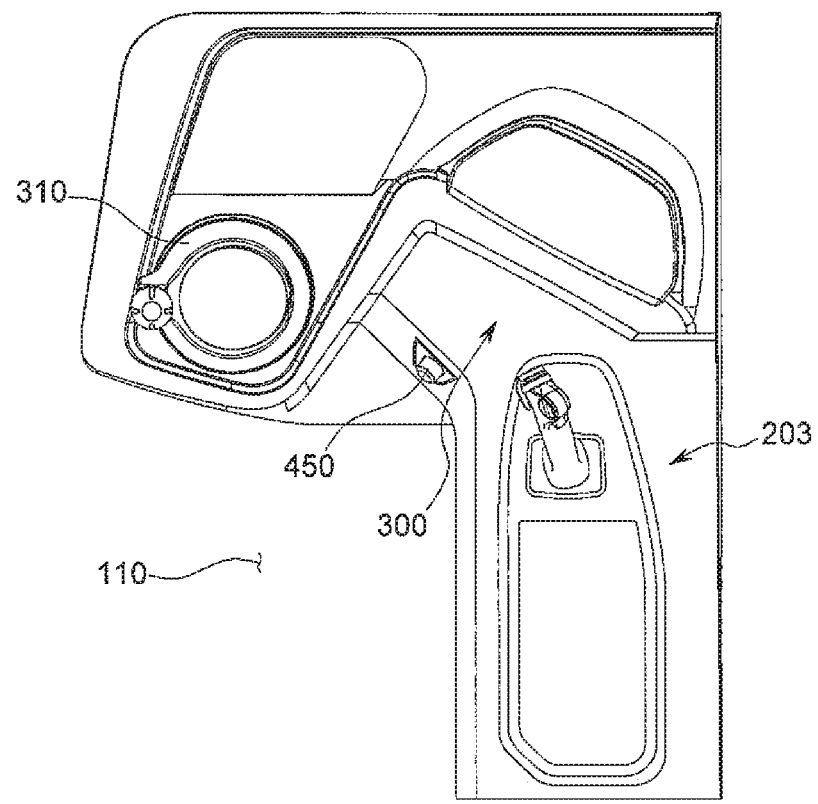
FIG. 8 is a view illustrating an industrial vehicle having an armrest apparatus according to a third exemplary embodiment of the present disclosure.
Figure 9:
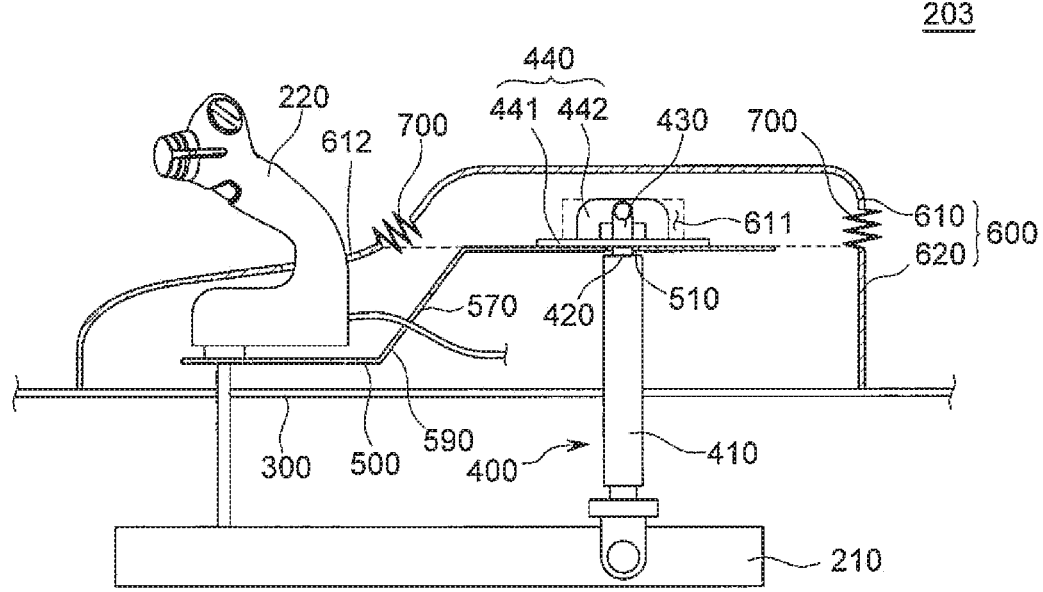
FIGS. 9 and 10 are views illustrating an operating state of the armrest apparatus according to the third exemplary embodiment of the present disclosure.
Figure 10:
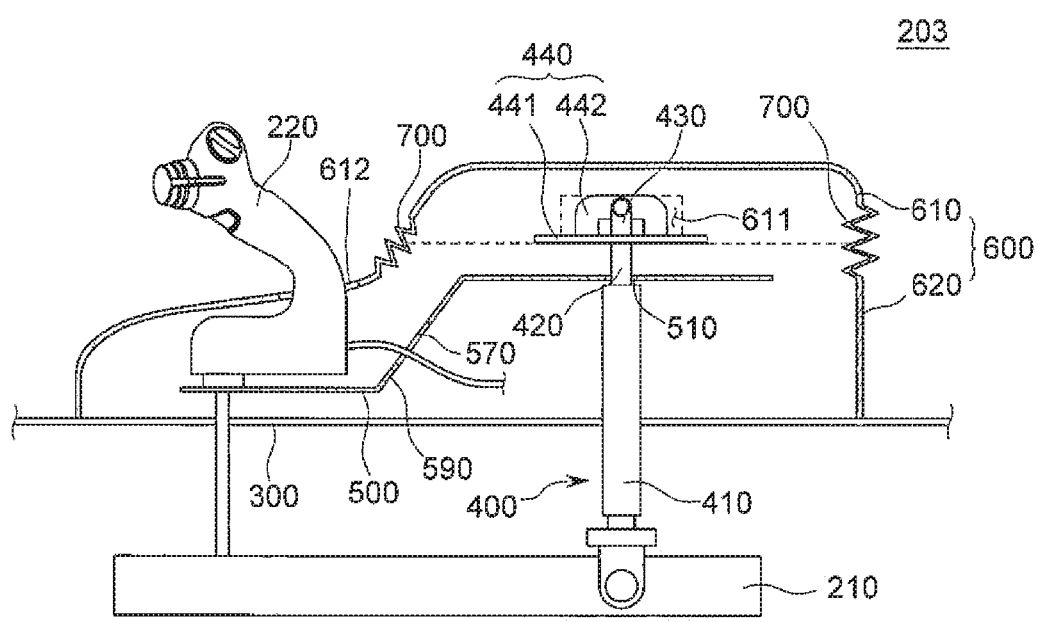
Figure 11:
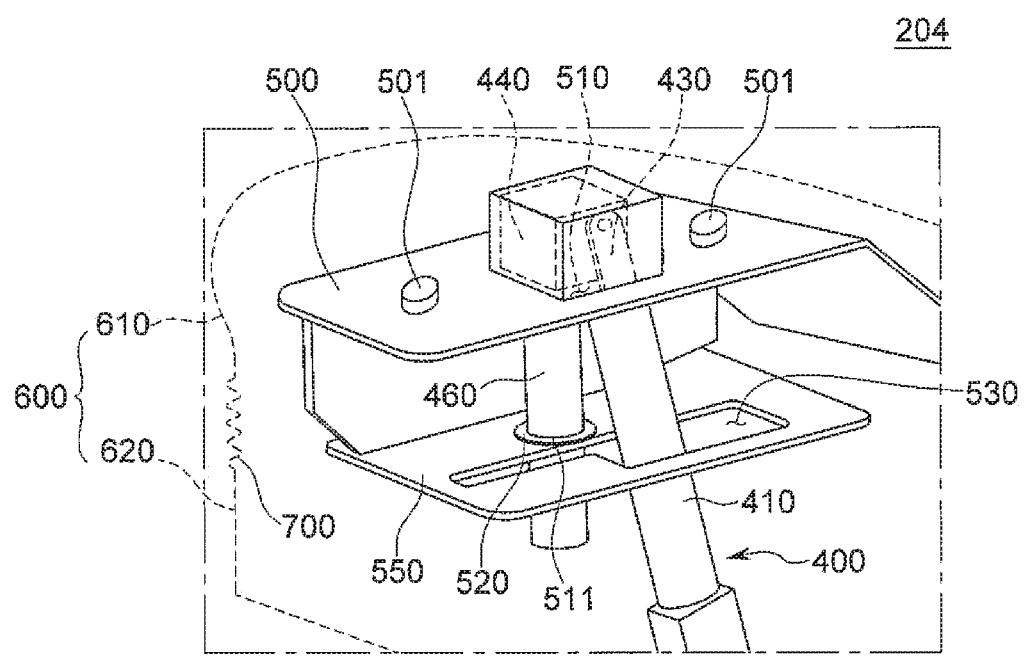
FIGS. 11 and 12 are views illustrating an operating state of the armrest apparatus according to the fourth exemplary embodiment of the present disclosure.
Figure 12:
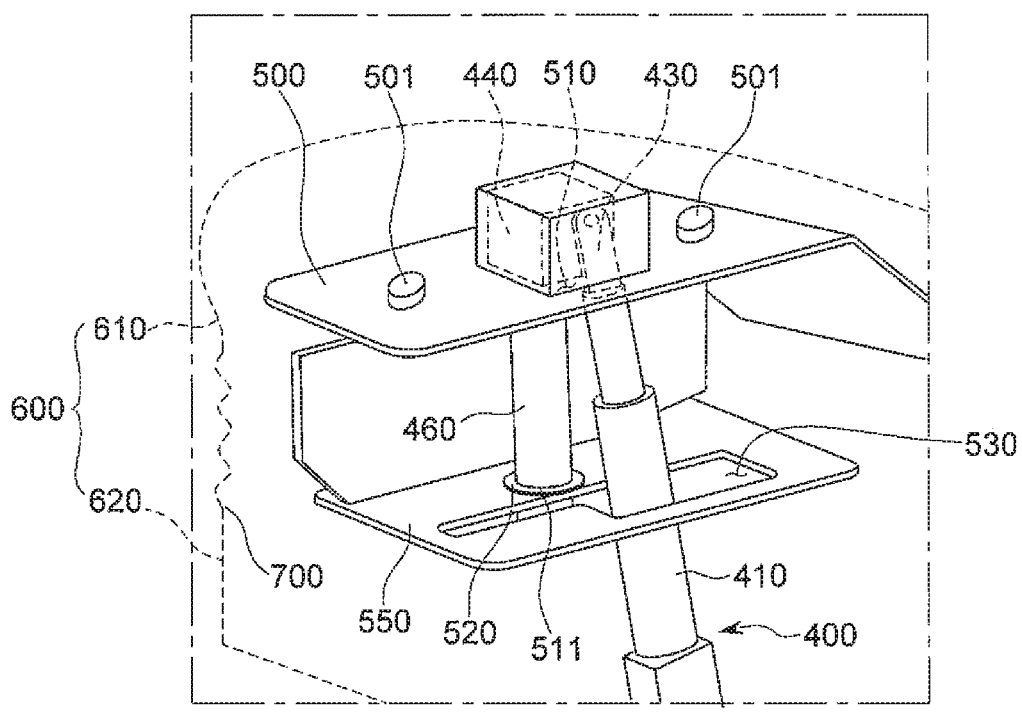

As illustrated in FIGS. 5, 11, and 12, the armrest apparatus 205 according to the fifth exemplary embodiment of the present disclosure includes the armrest body 600, the drive unit 400 including the cylinder 410, the connecting bracket 440, and the guide member 460, the first plate 500, the second plate 550. The armrest body 600 includes the first body 610 and the second body 620.

The first plate 500 is disposed inside the first body 610. Therefore, at least one region of the first plate 500 may support the first body 610. Specifically, the first body 610 may be disposed above the support frame 300.

The second plate 550 is disposed inside the second body 620. In addition, the second body 620 may be disposed between the first body 610 and the support frame 300. Further, the second body 620 may be supported by the support frame 300 or the stationary base 210 on which the support frame 300 is supported.

The shape of the first plate 500, the constituent elements supported by the first plate 500, the guide member 460, and the coupling structure between the guide hole 511 formed in the second plate 550 and the guide member 460 may be identical to those of the armrest apparatus 204 according to the aforementioned fourth exemplary embodiment of the present disclosure.

The armrest apparatus 205 according to the fifth exemplary embodiment of the present disclosure may further include the upward/downward movement adjusting member 450 of the armrest apparatus 201 according to the aforementioned first exemplary embodiment of the present disclosure.

The armrest apparatus 205 according to the fifth exemplary embodiment of the present disclosure may further include the cover 700 disposed between the first body 610 and the second body 620. The purpose of providing the cover 700 and the operation method of the cover 700 may be identical to those of the cover 700 of the armrest apparatus 202 according to the aforementioned second exemplary embodiment of the present disclosure.

The joystick installation hole 612 may be formed in one region of the first body 610 according to the fifth exemplary embodiment of the present disclosure. That is, one side of the joystick 220 may be supported at the other side of the first plate 500, and the other side of the joystick 220 may be disposed to protrude to the outside of the armrest body 600 through the joystick installation hole 612 formed in the armrest body 600. Therefore, the operator may control the operation of the working machine by manipulating the other side of the joystick 220.

That is, the first body 610 supported by the first plate 500 may be moved upward together with the joystick 220 when the first body 610 is moved upward by driving power provided by the drive unit 400.

Hereinafter, an operating process of the armrest apparatus 201 according to the first exemplary embodiment of the present disclosure will be described with reference to FIGS. 1 to 4.

The operator manipulates the upward/downward movement adjusting member 450 installed in the operation region 110. In this case, the fluid compressed in the cylinder 410 expands, and one end of the piston rod 420 is extended from the cylinder 410 by expansive force of the fluid.

The armrest body 600 is moved in the extension direction of the piston rod 420 in the height direction of the armrest body 600 through the connecting bracket 440 in accordance with the extension of the piston rod 420. Specifically, in accordance with the extension of the piston rod 420, the first plate 500 coupled to the connecting bracket 440 is also moved in the direction in which the piston rod 420 is extended. Therefore, the height of the joystick 220 supported by the first plate 500 is also adjusted.

In the case in which the cover 700 is disposed between the support frame 300 and the armrest body 600, the cover 700 may be moved in the movement direction of the armrest body 600 in the extension direction.

In this case, the operator adjusts the armrest body 600 in accordance with the operator's preference while pressing one surface of the armrest body 600. After completely adjusting the height, the operator releases the manipulation of the upward/downward movement adjusting member 450. Therefore, the length of the piston rod 420 may be maintained at the adjusted height. That is, the piston rod 420 is extended due to the expansion of the compressed fluid, the fluid in the cylinder 410 is compressed by force applied by the operator, and the piston rod 420 is retracted.

Even though the operator presses one surface of the armrest body 600 at the adjusted height, the armrest body 600 may be supported and pressing force may be absorbed by the fluid that fills the interior of the cylinder.

Hereinafter, an operating process of the armrest apparatus 202 according to the second exemplary embodiment of the present disclosure will be described with reference to FIGS. 4 to 7.

The operator manipulates the upward/downward movement adjusting member 450 installed in the operation region 110. In this case, the fluid compressed in the cylinder 410 expands, and one end of the piston rod 420 is extended from the cylinder 410 by expansive force of the fluid.

The armrest body 600 is moved in the extension direction of the piston rod 420 in the height direction of the first body 610 through the connecting bracket 440 in accordance with the extension of the piston rod 420. That is, the first body 610 may be moved away from the second body 620.

Specifically, in accordance with the extension of the piston rod 420, the first plate 500 coupled to the connecting bracket 440 is also moved in the direction in which the piston rod 420 is extended. Therefore, the height of the joystick 220 supported by the first plate 500 is also adjusted. That is, the height of the first body 610 may be adjusted in accordance with the movement of the first plate 500.

In the case in which the cover 700 is disposed between the first body 610 and the second body 620, the cover 700 may be moved in the movement direction of the first body 610 in the extension direction.

In this case, the operator adjusts the first body 610 in accordance with the operator's preference while pressing one surface of the first body 610. After completely adjusting the height, the operator releases the manipulation of the upward/downward movement adjusting member 450. Therefore, the length of the piston rod 420 may be maintained at the adjusted height. That is, the piston rod 420 is extended due to the expansion of the compressed fluid, the fluid in the cylinder 410 is compressed by force applied by the operator, and the piston rod 420 is retracted.

Even though the operator presses one surface of the first body 610 at the adjusted height, the first body 610 may be supported and pressing force may be absorbed by the fluid that fills the interior of the cylinder.

Hereinafter, an operating process of the armrest apparatus 203 according to the third exemplary embodiment of the present disclosure will be described with reference to FIGS. 4, and 8 to 10.

The operator manipulates the upward/downward movement adjusting member 450 installed in the operation region 110. In this case, the fluid compressed in the cylinder 410 expands, and one end of the piston rod 420 is extended from the cylinder 410 by expansive force of the fluid.

The first body 610 supported on the connecting bracket 440 is moved in the extension direction of the piston rod 420 in the height direction of the first body 610 in accordance with the extension of the piston rod 420. That is, the first body 610 may be moved away from the second body 620 that supports the first plate 500.

Specifically, in accordance with the extension of the piston rod 420, the first body 610 supported by the connecting bracket 440 is moved in the direction in which the piston rod 420 is extended. The piston rod 420 may be extended while passing through the through hole 510, thereby moving the first body 610 supported on the connecting bracket 440. Therefore, the first plate 500 on which the joystick 220 is installed remains supported on the second body 620, and the first body 610 may be moved away from the second body 620. That is, the operator may adjust only the height of the first body 610 on which the operator's arm is placed.

In the case in which the cover 700 is disposed between the first body 610 and the second body 620, the cover 700 may be moved in the movement direction of the first body 610 in the extension direction.

In this case, the operator adjusts the first body 610 in accordance with the operator's preference while pressing one surface of the first body 610. After completely adjusting the height, the operator releases the manipulation of the upward/downward movement adjusting member 450. Therefore, the length of the piston rod 420 may be maintained at the adjusted height. That is, the piston rod 420 is extended due to the expansion of the compressed fluid, the fluid in the cylinder 410 is compressed by force applied by the operator, and the piston rod 420 is retracted.

Even though the operator presses one surface of the first body 610 at the adjusted height, the first body 610 may be supported and pressing force may be absorbed by the fluid that fills the interior of the cylinder.

Hereinafter, an operating process of the armrest apparatus 204 according to the fourth exemplary embodiment of the present disclosure will be described with reference to FIGS. 1, 11, and 12.

The operator manipulates the upward/downward movement adjusting member 450 installed in the operation region 110. In this case, the fluid compressed in the cylinder 410 expands, and one end of the piston rod 420 is extended from the cylinder 410 by expansive force of the fluid.

The armrest body 600 is moved in the extension direction of the piston rod 420 in the height direction of the armrest body 600 through the connecting bracket 440 in accordance with the extension of the piston rod 420. Specifically, in accordance with the extension of the piston rod 420, the first plate 500 coupled to the connecting bracket 440 is also moved in the direction in which the piston rod 420 is extended. Therefore, the height of the joystick 220 supported by the first plate 500 is also adjusted.

When the first plate 500 and the armrest body 600 supported by the first plate 500 are moved in the height direction, the guide member 460 may slide in the longitudinal direction along the guide hole 511 formed in the second plate 550 and may also move in the movement direction of the armrest body 600. In this case, the movement of the armrest body 600 in the height direction may be guided by the guide member 460 as well as the cylinder 410.

In the case in which the cover 700 is disposed between the support frame 300 and the armrest body 600, the cover 700 may be moved in the movement direction of the armrest body 600 in the extension direction.

In this case, the operator adjusts the armrest body 600 in accordance with the operator's preference while pressing one surface of the armrest body 600. After completely adjusting the height, the operator releases the manipulation of the upward/downward movement adjusting member 450. Therefore, the length of the piston rod 420 may be maintained at the adjusted height. That is, the piston rod 420 is extended due to the expansion of the compressed fluid, the fluid in the cylinder 410 is compressed by force applied by the operator, and the piston rod 420 is retracted.

Even though the operator presses one surface of the armrest body 600 at the adjusted height, the armrest body 600 may be supported and pressing force may be absorbed by the fluid that fills the interior of the cylinder.

Hereinafter, an operating process of the armrest apparatus 205 according to the fifth exemplary embodiment of the present disclosure will be described with reference to FIGS. 5, 11, and 12.

The operator manipulates the upward/downward movement adjusting member 450 installed in the operation region 110. In this case, the fluid compressed in the cylinder 410 expands, and one end of the piston rod 420 is extended from the cylinder 410 by expansive force of the fluid.

The first body 610 is moved in the extension direction of the piston rod 420 in the height direction of the armrest body 600 through the connecting bracket 440 in accordance with the extension of the piston rod 420. Specifically, in accordance with the extension of the piston rod 420, the first plate 500 coupled to the connecting bracket 440 is also moved in the direction in which the piston rod 420 is extended. Therefore, the height of the joystick 220 supported by the first plate 500 is also adjusted.

When the first plate 500 and the first body 610 supported by the first plate 500 are moved in the height direction, the guide member 460 may slide in the longitudinal direction along the guide hole 511 formed in the second plate 550 and may also move in the movement direction of the first body 610. In this case, the movement of the armrest body 600 in the height direction may be guided by the guide member 460 as well as the cylinder 410. That is, the first body 610 moves away from the second body 620, such that the height of the armrest apparatus 205 may be adjusted.

In the case in which the cover 700 is disposed between the first body 610 and the second body 620, the cover 700 may be moved in the movement direction of the first body 610 in the extension direction.

In this case, the operator adjusts the first body 610 in accordance with the operator's preference while pressing one surface of the first body 610. After completely adjusting the height, the operator releases the manipulation of the upward/downward movement adjusting member 450. Therefore, the length of the piston rod 420 may be maintained at the adjusted height. That is, the piston rod 420 is extended due to the expansion of the compressed fluid, the fluid in the cylinder 410 is compressed by force applied by the operator, and the piston rod 420 is retracted.

Even though the operator presses one surface of the first body 610 at the adjusted height, the first body 610 may be supported and pressing force may be absorbed by the fluid that fills the interior of the cylinder.

With the configuration as described above, according to the armrest apparatuses 201, 202, 203, 204, and 205 according to the exemplary embodiments of the present disclosure and the industrial vehicle 100 including the same, the height of the armrest body 600 may be adjusted in accordance with the operator's preference.

Therefore, the height of the armrest body 600 may be adjusted in accordance with different body structures of the operators, and as a result, it is possible to reduce fatigue caused to the operators when the operators manipulate the working machine by using the joystick 220.

While the exemplary embodiments of the present disclosure have been described with reference to the accompanying drawings, those skilled in the art will understand that the present disclosure may be implemented in any other specific form without changing the technical spirit or an essential feature thereof.

Accordingly, it should be understood that the aforementioned exemplary embodiments are described for illustration in all aspects and are not limited, and the scope of the present disclosure shall be represented by the claims to be described below, and it should be construed that all of the changes or modified forms induced from the meaning and the scope of the claims, and an equivalent concept thereto are included in the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An armrest apparatus disposed on an operator seat, the armrest apparatus comprising:
   an armrest body which supports an operator's arm;
   a drive unit which has a variable length, provides power to move the armrest body upward, and absorbs force applied in a direction in which the armrest body moves downward;
   a first plate which is disposed inside the armrest body and supports the armrest body in one direction;

wherein a first side of the first plate supports the armrest body, and a second side of the first plate supports a joystick; and wherein the first plate is bent such that one of the sides of the first plate is disposed higher than the other side of the first plate.

2. The armrest apparatus of claim 1, wherein the drive unit includes:
a cylinder which is extended or retracted in accordance with an expanded state of a compressed fluid and configured to move the armrest body upward or downward; and
a connecting bracket which connects one end of the cylinder and the armrest body.

3. The armrest apparatus of claim 2, wherein the connecting bracket includes:
a support member which is coupled to the first plate; and
a rotation restricting member which has a central portion protruding from the support member to support one end of the cylinder, and has both sides connected to the support member to restrict a rotation of one end of the cylinder.

4. The armrest apparatus of claim 2, wherein a through hole is formed in the first plate so that one end of the cylinder penetrates the through hole, and
the connecting bracket includes:
a support member which is disposed on the first plate so as to be movable upward or downward, has therein a support hole formed to face the through hole, and has an outer portion having a length relatively greater than a diameter of the through hole; and
a rotation restricting member which has a central portion protruding from the support member to support one end of the cylinder, and has both sides connected to the support member to restrict a rotation of one end of the cylinder.

5. The armrest apparatus of claim 2, wherein the armrest body includes:
a first body which is coupled to the connecting bracket; and
a second body which is disposed below the first body and supports the first body.

6. The armrest apparatus of claim 1, wherein the drive unit further includes a guide member that guides an upward/downward movement of the armrest body supported by the first plate.

7. The armrest apparatus of claim 6, further comprising:
a second plate which is disposed below the first plate so as to be spaced apart from the first plate and has a guide hole formed such that the other side of the guide member is inserted into the guide hole.

8. An industrial vehicle including an operation region in which an operator is seated, the industrial vehicle comprising:
a support frame which is disposed in the operation region;
a joystick which is manipulated by the operator;
an armrest body which is disposed on the support frame and has a joystick installation hole in which the joystick is installed;
a first plate which is disposed inside the armrest body, and has one side that supports the armrest body, and an other side that supports the joystick;
a second plate which is disposed inside the armrest body below the first plate and has a guide hole;
a guide member which has one side that supports the first plate, and an other side that is inserted into the guide hole and slidably supported;
a cylinder which provides power to move the first plate upward from the second plate; and
an upward/downward movement adjusting member which is disposed in the operation region and controls extension or retraction of the cylinder.

9. The industrial vehicle of claim 8, wherein the armrest body includes:
a first body which is disposed on the support frame, is supported by the first plate, and has the joystick installation hole; and
a second body which is disposed between the first body and the support frame.

10. An industrial vehicle including an operation region in which an operator is seated, the industrial vehicle comprising:
a support frame which is disposed in the operation region;
a joystick which is manipulated by the operator;
a first body which is disposed on the support frame and supports an operator's arm;
a second body which is disposed between the first body and the support frame and has a joystick installation hole in which the joystick is installed;
a first plate which has one side that supports the second body, and an other side that supports a joystick;
a cylinder which provides power to move the first body upward from the second body; and
an upward/downward movement adjusting member which is disposed in the operation region and controls extension or retraction of the cylinder.

11. The industrial vehicle of claim 10, further comprising:
a cover which is disposed between the first body and the second body and extendable and retractable in accordance with the upward/downward movement of the first body.

* * * * *